No. 827,695. PATENTED JULY 31, 1906.
C. F. LEONARD.
STEERING AND BRAKE MECHANISM FOR WIRE FENCE MACHINES.
APPLICATION FILED SEPT. 19, 1905.
2 SHEETS—SHEET 1.
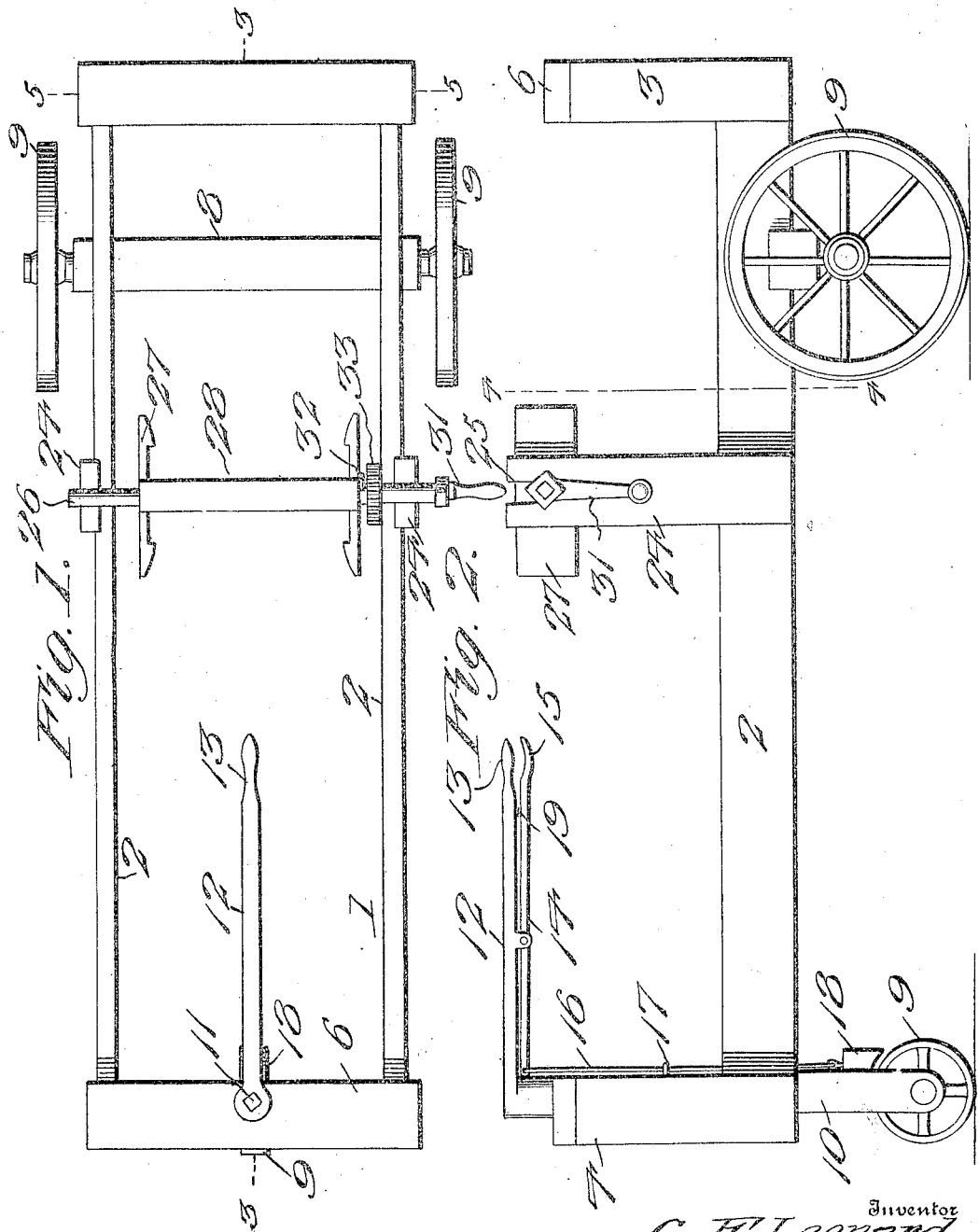
Witnesses
Wm J. Koerth
C. C. Hines
Inventor
C. F. Leonard,
By Victor J. Evans
Attorney No. 827,695. PATENTED JULY 31, 1906.
C. F. LEONARD.
STEERING AND BRAKE MECHANISM FOR WIRE FENCE MACHINES.
APPLICATION FILED SEPT. 19, 1905.
2 SHEETS—SHEET 2.
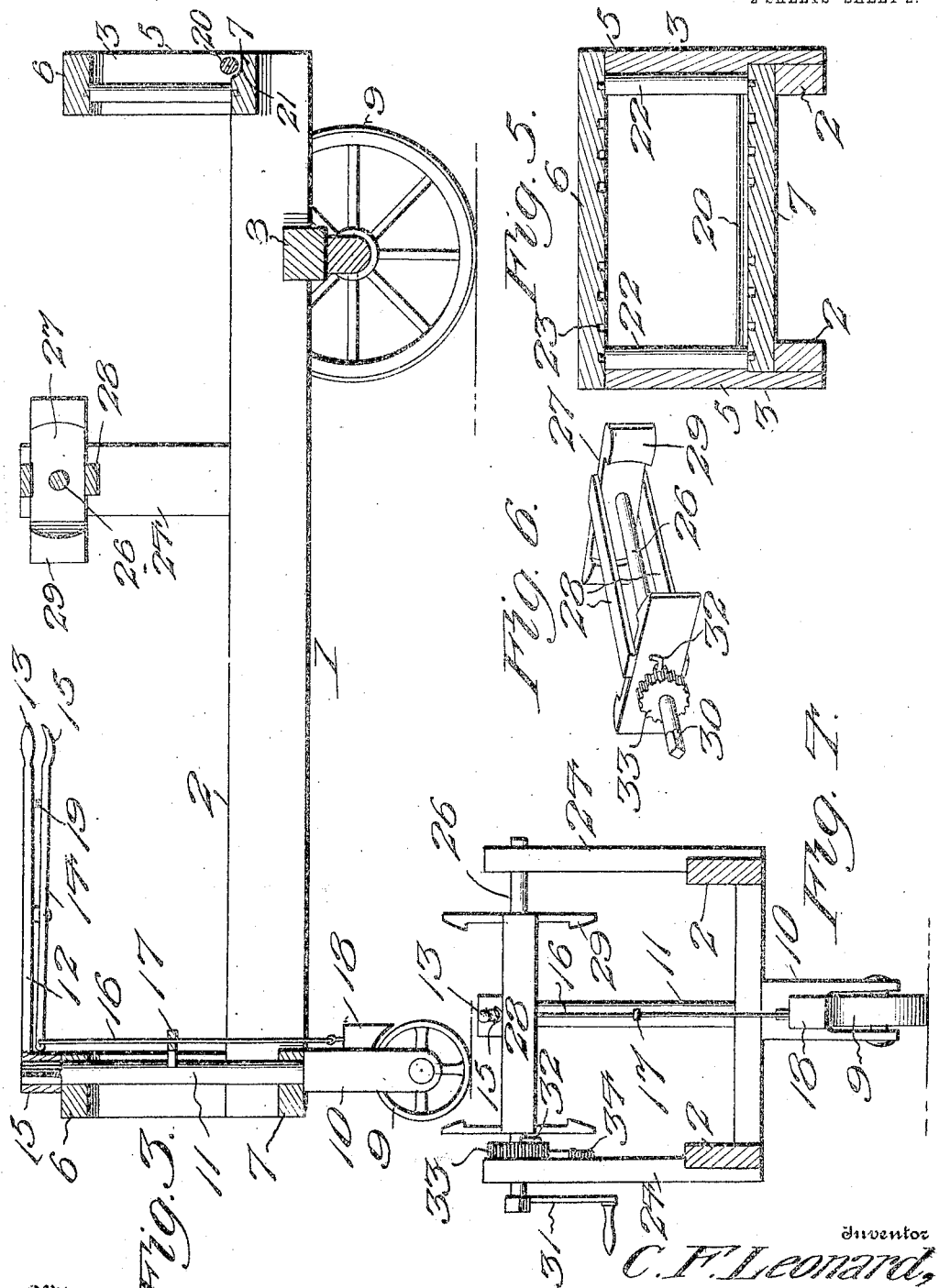
Witnesses
Inventor
C. F. Leonard,
By Victor J. Evans
Attorney

UNITED STATES PATENT OFFICE.

CHARLES F. LEONARD, OF IDAHO FALLS, IDAHO.

STEERING AND BRAKE MECHANISM FOR WIRE-FENCE MACHINES.

No. 827,695.

Specification of Letters Patent.

Patented July 31, 1906.

Original application filed February 24, 1905, Serial No. 247,179. Divided and this application filed September 19, 1905. Serial No. 279,139.

*To all whom it may concern:*

Be it known that I, CHARLES F. LEONARD, a citizen of the United States of America, residing at Idaho Falls, in the county of Bingham and State of Idaho, have invented new and useful Improvements in Steering and Brake Mechanism for Wire-Fence Machines, of which the following is a specification.

This invention relates to a steering and braking mechanism for machines of that character employed for removing and rewinding fence-wires and performing other analogous work, such as stretching such wires or paying them out from a reel for application to the fence-post, and which is applicable for use in building, demolishing, removing, or resetting barbed and other wire fences.

The present application is a division of my prior application filed February 24, 1905, Serial No. 247,179, and relates to the steering and braking mechanism *per se* disclosed therein, the object of the invention being to provide simple and effective means whereby the machine may be readily guided and stopped whenever desired and controlled when descending grades.

In the accompanying drawings, Figure 1 is a top plan view of a machine of the character described embodying my invention. Fig. 2 is a side elevation thereof. Fig. 3 is a longitudinal section on line 3 3 of Fig. 1. Fig. 4 is a cross-section on line 4 4 of Fig. 2. Fig. 5 is a cross-section on line 5 5 of Fig. 1. Fig. 6 is a detail view of the reel.

Referring now more particularly to the drawings, the numeral 1 indicates the main frame or body of the machine, which comprises side bars 2 and rectangular front and rear end frames 3 and 4, rising from said side bars, each of said end frames comprising side pieces or standards 5, connected by upper and lower cross-bars 6 and 7, the lower ends of the standards and the cross-bars 7 being attached to the ends of the side bars and serving to connect the same together.

Secured to the side bars at a point immediately in rear of the frame 3 is a transverse axle 8, provided with terminal spindles on which supporting-wheels 9 are mounted. These wheels in connection with the rear guide-wheel 9 support the frame 1 and enable it to be conveniently transported from place to place. The wheel is journaled in a yoke 10, arranged upon the lower end of a stem 11, extending upwardly through and journaled in the top and bottom cross-bars 6 and 7 of the rear frame-piece 4. The upper end of the stem projects above the cross-bar 6 and is made of polygonal form to fit within a corresponding socket upon one end of a steering-lever 12, which lever projects forwardly and is provided at its free end with a hand-grip 13, by which it may be swung toward either side of the frame to adjust the wheel 9 to guide the machine.

Pivoted to the lever 12 is a brake-lever 14, which is provided at its free forward end with a hand-grip 15, disposed below the grip 13, so that the operator may conveniently operate the same without removing his hand from the grip 13. The rear end of the lever 14 is pivoted to a rod 16, which slides vertically in a guide 17, carried by the stem 11, and carries at its lower end a brake block or shoe 18, which is movable into and out of engagement with the periphery of the wheel 9, whereby the machine may be readily brought to a stop and controlled when running down grades. A spring 19 is suitably attached to and interposed between the levers 12 and 14 to depress the handle end of the lever 14 to thereby normally project the rear end thereof upward, thereby holding the brake-block 18 out of engagement with the wheel 9.

The machine is designed to run backward or forward for the purpose of reeling up or paying out the wire in constructing and removing or demolishing fences and to enable the wire to be properly guided and conducted to the reel in either direction of movement of the machine. The end frame 3 is provided with a horizontal guiding-roller 20, which fits partly within a depression 21, formed in the upper outer edge of the cross-bar 7, and is provided with terminal journals or trunnions which turn in bearing-recesses formed in the side pieces or standards 5. This roller supports and guides the wire to the reel hereinafter described. Disposed also in the frame 3 is a pair of vertical rollers 22, which serve as side pieces to allow the wire to have free movement and prevent the same from scraping against the side pieces or standards 5. These rollers are formed at their ends with journals or trunnions which are respectively adapted to fit and turn within series of bearing-recesses 23, formed in the cross-bars 6 and 7, said series being arranged on opposite sides of the vertical center of said cross-bars, so that the rollers 22 may be adjusted relative to each other to increase or diminish the space between, and thus properly guide the wires for movement to and from reels of different lengths.

Arranged somewhat forward of the center of the main frame 1 and in rear of the axle 8 are reel-supporting standards 24, which rise vertically from the side bars 2 and are provided in their upper ends with open bearings 25 to receive a reel-shaft 26, which is fitted at its ends to turn therein and is readily detachable therefrom to permit of the convenient connection and disconnection of the reel. The reel is rigidly mounted on the shaft 26 between the standards 24 and comprises a pair of end heads or pieces 27 and connecting cross bars or pieces 28, secured at their ends to said end pieces, the latter having central apertures for the passage of the shaft 26 and suitably secured thereto. As shown, the ends of the heads or end pieces 27 are beveled or outwardly flared, as indicated at 29, to allow the wire winding on and unwinding from the reel to move freely without interference.

One of the projecting ends of the shaft 26 is made polygonal in form, as indicated at 30, to receive a crank-handle 31, by which the shaft may be operated, and between this polygonal portion 30 and the adjacent end piece or head 27 of the reel the shaft is provided with a hook or projection 32, to which one end of the wire which is to be wound upon the reel is connected. Also rigidly mounted upon the shaft adjacent the said hook is a ratchet-wheel 33, adapted to be engaged by a pawl 34 on the adjacent standard 24 to hold the shaft and reel against retrograde rotation.

In employing the device for rewinding the wires of fences which are to be rewired or subjected to other operations required for removal of the line-wires therefrom the end of the wire to be removed is passed rearwardly over the roller 20 and then engaged with the hook 32 on the reel, after which the machine is drawn or pushed forwardly and the crank 31 operated to turn the reel and wind the wire thereon. It will be observed that the handle 13 of the steering-lever 12 projects forwardly a sufficient distance to enable the operator to grasp the same in the left hand while the right is being employed to turn the reel-crank 31, thus enabling the operator to take up the wire and steer the machine at the same time, this ability of the operator to perform both functions enabling him to so guide or control the machine as to cause the wire to wind clear over and along the surface of the reel, thus rendering the use of the ordinary movable wire guide unnecessary. Also by depressing the handle of the brake-lever in proximity to the handle of the steering-lever the operator may further stop the machine whenever desired and control the descent of the same down grade. Provision is thus made whereby the machine may be readily controlled without the use of any auxiliary elements. When it is desired to swing or pay out wire from the reel, a draft-animal may be suitably hitched to the rear end of the main frame and the machine run backward, as will be readily understood. The device may also be employed for stretching wire in an obvious manner.

It will be understood that the mode of mounting the shaft 26 permits of the ready removal of a filled reel and the substitution of an empty one therefor when occasion requires and that by adjusting the side guide-rollers 22 at the forward end of the frame a wire running to or from the machine from either side will be properly guided to suit the length of the reel employed.

Having thus described the invention, what I claim is—

In a steering and brake mechanism for wire-fence machines, the combination with a frame provided at the rear with supporting-wheels, and in advance thereof with a reel, said reel being provided with an actuating device, of a supporting and steering wheel at the front of the frame, a steering-post journaled vertically in the frame and carrying said steering-wheel, a steering-lever extending rearwardly from the post toward the reel and provided at its rear or free end with a handle, whereby the reel-actuating device and lever are arranged in relative position to be simultaneously controlled, a guide upon the steering-post, a rod slidable vertically in said guide at the rear of the steering-post, a brake-shoe connected with the lower end of the rod and adapted to engage the steering-wheel, a brake-lever extending rearwardly with the steering-lever and parallel therewith and intermediately fulcrumed thereto, said brake-lever being pivotally attached at its forward end to the upper end of the rod and provided at its rear end with a handle arranged to be simultaneously gripped with the handle of the steering-lever, whereby both levers and the reel are adapted to be conveniently controlled by a single operator, and a spring arranged between the levers to normally spread their handles apart, substantially as described.

In testimony whereof I affix my signature in presence of two witnesses.

CHARLES F. LEONARD.

Witnesses:
JAMES L. EASTIN,
HERMAN S. LEONARD.